United States Patent
Kohn et al.

(10) Patent No.: US 7,234,027 B2
(45) Date of Patent: Jun. 19, 2007

(54) INSTRUCTIONS FOR TEST & SET WITH SELECTIVELY ENABLED CACHE INVALIDATE

(75) Inventors: James R. Kohn, Inver Grove Heights, MN (US); Robert J. Baird, Merritt Island, FL (US)

(73) Assignee: Cray Inc., Seattle, WA (US)

( * ) Notice: Subject to any disclaimer, the term of this patent is extended or adjusted under 35 U.S.C. 154(b) by 452 days.

(21) Appl. No.: 10/045,591

(22) Filed: Oct. 24, 2001

(65) Prior Publication Data

US 2003/0079090 A1 Apr. 24, 2003

(51) Int. Cl.
G06F 12/00 (2006.01)
G06F 9/52 (2006.01)

(52) U.S. Cl. ..................... 711/140; 713/400

(58) Field of Classification Search ........ 711/133–134, 711/144–145, 159, 140–141, 154–155, 150–152, 711/3, 158, 168, 156, 163; 712/200, 204, 712/203, 225–229; 709/400, 248, 226; 710/200, 710/240; 713/400; 365/195–196
See application file for complete search history.

(56) References Cited

U.S. PATENT DOCUMENTS

| | | | | |
|---|---|---|---|---|
| 4,513,367 A * | 4/1985 | Chan et al. ................ | 711/145 |
| 5,193,166 A | 3/1993 | Menasce ..................... | 711/120 |
| 5,860,110 A * | 1/1999 | Fukui et al. ................ | 711/141 |
| 5,928,353 A | 7/1999 | Yamada ..................... | 712/200 |
| 6,260,131 B1 | 7/2001 | Kikuta et al. .............. | 711/210 |
| 6,496,902 B1 * | 12/2002 | Faanes et al. .............. | 711/118 |
| 6,629,207 B1 * | 9/2003 | Yoshioka et al. .......... | 711/125 |
| 6,763,327 B1 * | 7/2004 | Songer et al. ............... | 703/21 |
| 6,859,861 B1 | 2/2005 | Rhodes ....................... | 711/119 |
| 2001/0049742 A1 | 12/2001 | Steely, Jr. et al. ......... | 709/232 |
| 2002/0144061 A1 * | 10/2002 | Faanes et al. .............. | 711/126 |

OTHER PUBLICATIONS

Brandt et al., "The benchmarker's Guide for CRAY SV1 Systems", Jul. 20, 2000, pp. 1-39.*

* cited by examiner

Primary Examiner—Denise Tran
(74) Attorney, Agent, or Firm—Schwegman, Lundberg, Woessner, and Kluth, P.A.

(57) ABSTRACT

A method and system for selectively enabling a cache-invalidate function supplement to a resource-synchronization instruction such as test-and-set. Some embodiments include a first processor, a first memory, at least a first cache between the first processor and the first memory, wherein the first cache caches data accessed by the first processor from the first memory, wherein the first processor executes: a resource-synchronization instruction, an instruction that enables a cache-invalidate function to be performed upon execution of the resource-synchronization instruction, and an instruction that disables the cache-invalidate function from being performed upon execution of the resource-synchronization instruction.

7 Claims, 4 Drawing Sheets

INSTRUCTIONS FOR TEST & SET WITH SELECTIVELY ENABLED CACHE INVALIDATE

FIELD OF THE INVENTION

The present invention is related to memory management, and more particularly to instructions that selectively modify the function of other instructions and allow new functions to be added to certain new code without modifying the function of preexisting old code.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Cray Incorporated, All Rights Reserved.

BACKGROUND INFORMATION

Parallel-processor systems are efficient, scalable, and highly available computer. To manage parallel-processor systems, there is a need for a cache coherence system and control in order to obtain desired system operation.

Conventional hierarchical cache systems provide small fast cache memories next to each fast information processing unit (also called a processing element), and larger memories that are further away and slower. It is impractical to make a fast memory large enough to hold all of the data for a large computer program, and when memories are made larger, the physical size increases, access times slow and heat dissipation becomes a bigger issue. Thus data is moved to data caches that are closer to the processing element when that data is being used or likely to be used soon by the processing element. Parallel-processor systems thus typically include a hierarchy of cache levels. For example, a processing element might have a level-0 (L0) cache on the same chip as a processor. This L0 cache is the smallest, and runs at the fastest speed since there are no chip-to-chip crossings. One or more intermediate levels of cache (called, e.g., L1, L2, etc., as they are further from the processor) might be placed at successively further distances and successively slower access times from the processing element. A large main memory, typically implemented using DDR SDRAMs (double-data-rate synchronous-dynamic random-access memories) is then typically provided. Some systems provide a solid-state-disk (SSD) cache between the main memory and the system's disc array, and caches data from that mass storage at, e.g., a slower speed than main memory. At each level moving further from the processor, there is typically a larger store running at a slower speed. For each level of storage, the level closer to the processor thus typically contains a subset of the data in the level further away. For some systems, in order to purge data in the main memory leaving that data only in the disc storage, one must first purge all of the portions of that data that may reside in the L0, L1, and/or L2 levels of cache.

Further, several processing elements may be operating on the same data at or nearly at the same time. If one processor modifies its cached copy of the data, it must typically notify all the other processors, in order that they do not perform conflicting operations based on their now-old copies of that data. One way to do this is to force a cache purge (also called a cache invalidate) on any cache that might have a copy of outdated data.

However, as more processors and more caches are added to a system, there can be more competition for scarce resources including caches. There is a need to maintain coherence of data (i.e., ensuring that as data is modified, that all cached copies are timely and properly updated) among the various cache types, levels, and locations. One conventional synchronization method uses a "test-and-set" instruction that is performed atomically (i.e., it is guaranteed to operate indivisibly—as if once it is started it will complete without interruption). If several processes are being multi-tasked in a single processor or across several processing elements of a multiprocessor system, they can have flags that indicate various resources, and these flags can be tested and set (as locks to the various resources) by the atomic test-and-set instructions performed within each of the several processes. The processes can by swapped in and out and run asynchronously and simultaneously on one or more processing elements, and the flags will be used by the operating systems to prevent conflicting or contradictory operations.

It is desirable to maintain the operability of existing codes and programs by allowing existing instructions to continue to operate in their original manner while executing those existing programs, while also adding new functions and capabilities to a computer architecture.

SUMMARY OF THE INVENTION

One aspect of the present invention provides a method of maintaining a cache memory in a computer system having a first processor, a first memory, and at least a first cache between the first processor and the first memory. This method includes performing a first memory access to the first memory by the first processor, storing a first cache line from the first memory into the first cache, performing an instruction that enables a cache-invalidate function to be performed by the first processor upon execution of a resource-synchronization instruction, performing the resource-synchronization instruction, wherein at least the first cache line is invalidated in the first cache (in some embodiments, the entire cache is invalidated), performing a second memory access to the first memory by the first processor, storing a second cache line from the first memory into the first cache, performing an instruction that disables the cache-invalidate function from being performed by the first processor upon execution of the resource-synchronization instruction, and performing the resource-synchronization instruction, wherein at least the second cache line is not invalidated in the first cache.

Another aspect of the present invention provides a computer instruction set that includes a resource-synchronization instruction, an instruction that enables a cache-invalidate function to be performed upon execution of the resource-synchronization instruction, and an instruction that disables the cache-invalidate function from being performed upon execution of the resource-synchronization instruction. In some embodiments, the resource-synchronization instruction is a test-and-set instruction. In some such embodiments, the instruction that enables the cache-invalidate function is an enable-test-and-set-invalidate instruction, and the instruction that disables the cache-invalidate function is an disable-test-and-set-invalidate instruction. In some embodiments (regardless of whether a TAS instruction is used), the instruction that enables the cache-invalidate function is an enable-resource-synchronization-instruction-invalidate instruction, and the instruction that disables the cache-invalidate function is an disable-resource-synchronization-instruction-invalidate instruction.

Another aspect of the present invention provides an information-processing system that includes a first processor, a first memory, at least a first cache between the first processor and the first memory, wherein the first cache caches data accessed by the first processor from the first memory, wherein the first processor executes: a resource-synchronization instruction, an instruction that enables a cache-invalidate function to be performed upon execution of the resource-synchronization instruction, and an instruction that disables the cache-invalidate function from being performed upon execution of the resource-synchronization instruction.

BRIEF DESCRIPTION OF THE DRAWINGS

In the following drawings, the same number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
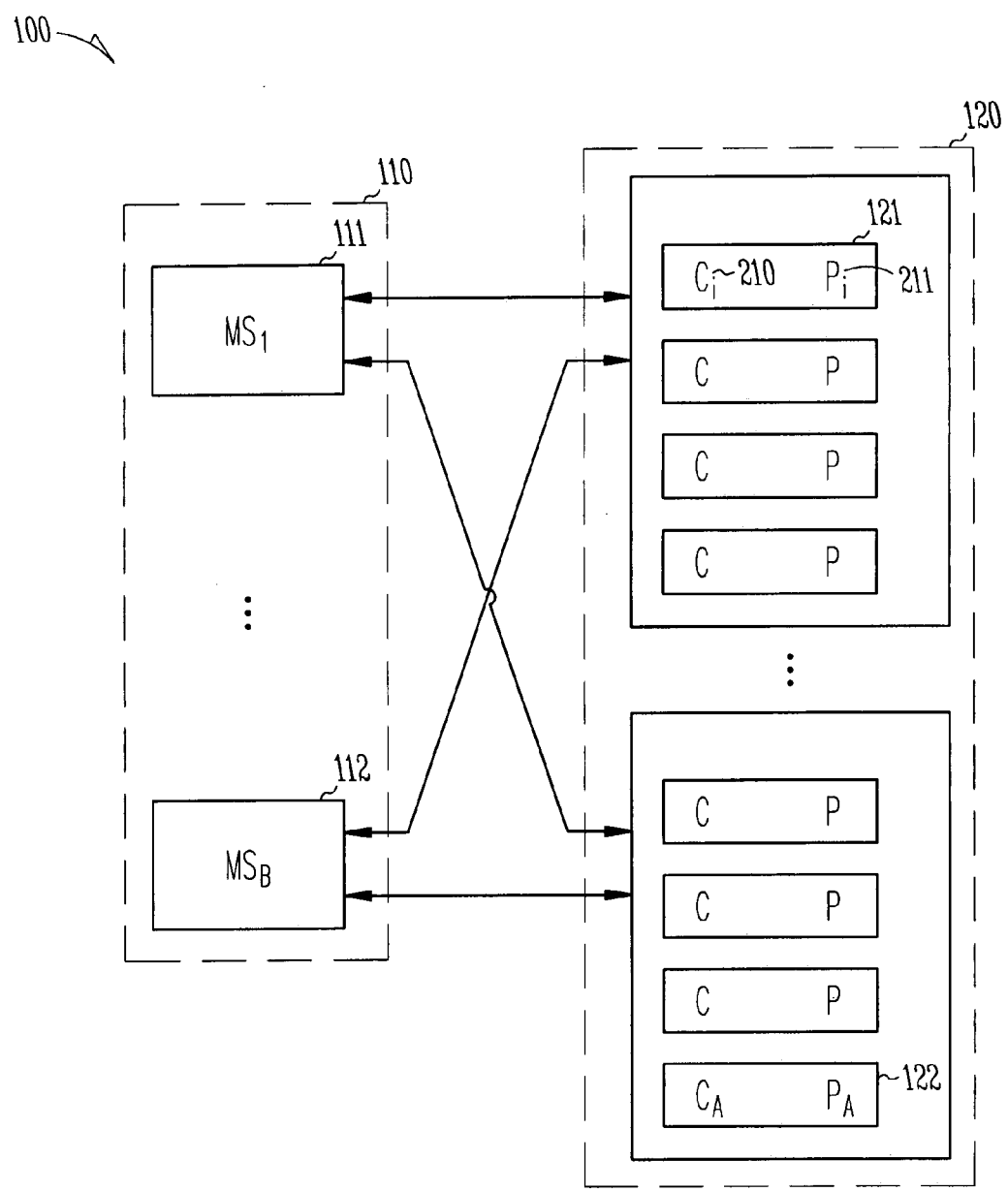
FIG. 1 is a block diagram illustrating a information handling system 100 having multi-processing element 120 and multi-memory section 110.

FIG. 1 is a block diagram illustrating one embodiment of a multiprocessing element and multi-memory section information handling system 100. Information handling system 100 is a system capable of processing information control commands, including data access and storage commands. Information handling system 100 includes processing elements 120, individually labeled $PE_1$ 121 through $PE_A$ 122, where A is two or greater, and memory sections 110 individually labeled $MS_1$ 111 through $MS_B$ 112, where B is greater than or equal to one (i.e., some embodiments include a single memory section, one embodiment includes 8 memory sections). B does not necessarily equal A, so that there may be a different number of memory sections than processing elements. Each one of the processing elements $PE_1$ through $PE_A$ is operatively coupled to each one of the memory sections $MS_1$ through $MS_B$. Each processing element 121–122 is capable of sending and receiving commands and data to and from each of the memory sections 111–112.

In some embodiments, A and B are both equal to eight. In this implementation, information handling system 100 has eight processing elements and eight memory sections, such that each processing element is operatively coupled to each of the eight memory sections. In some embodiments, each PE is an individual processor having its own cache. In other embodiments, each PE is a multi-chip module (MCM) having four processors and four caches.

In some embodiments, the instruction set and function of the present invention are added to the architecture of a conventional Cray SV1 supercomputer, thus forming the Cray SV1e supercomputer. The Cray SV1 includes an 4-CPU to 32-CPU multiprocessor having 300 MHz CPUs, about 22 GB/second sustained memory bandwidth, wherein the CPU can be a field upgrade option for all Cray J90 Systems. The new SV1e CPU also includes a faster clock cycle time (500 MHz clock, capable of up to 2 GFLOPS), includes an improved cache and is a field upgrade option for J90 & SV1 series systems. The SV1 combines a CPU & cache onto one ASIC (application-specific integrated circuit) that increases cache bandwidth by 67%, reduces cache latency by 50%. Four such ASICs are packaged onto a single multi-chip module (MCM) to provide 8.0 GFLOPS on a module—4 dual-pipe vector processors running at a 500 MHz clock rate, and 1 GigaRing IO channel per module. In some embodiments, these ASICs use an IBM 0.12 micron copper CMOS technology, and each include a cache of 256 Kbytes for instructions, vector, and scalar data.

In other embodiments, the instruction set and function of the present invention are added to the architecture of a Cray SV1ex supercomputer that also includes the SV1e central processing unit (CPU), and a new memory subsystem having 40 or more GB/second sustained memory bandwidth, and 32 or 96 GBytes internal SSD (solid-state-disk cache memory).

Figure 2A:
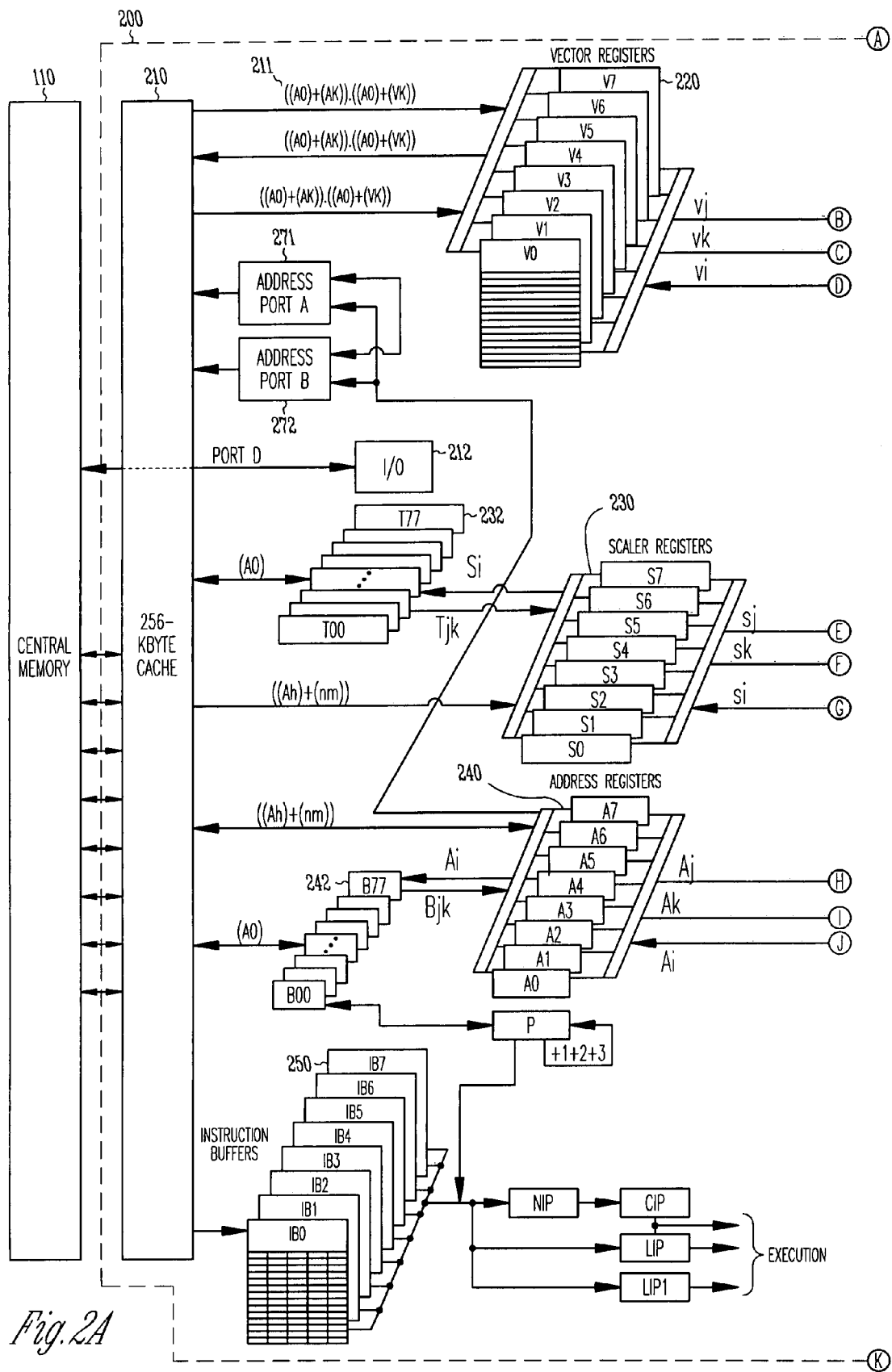
FIG. 2 is a block diagram of a CPU 200.
Figure 2B:
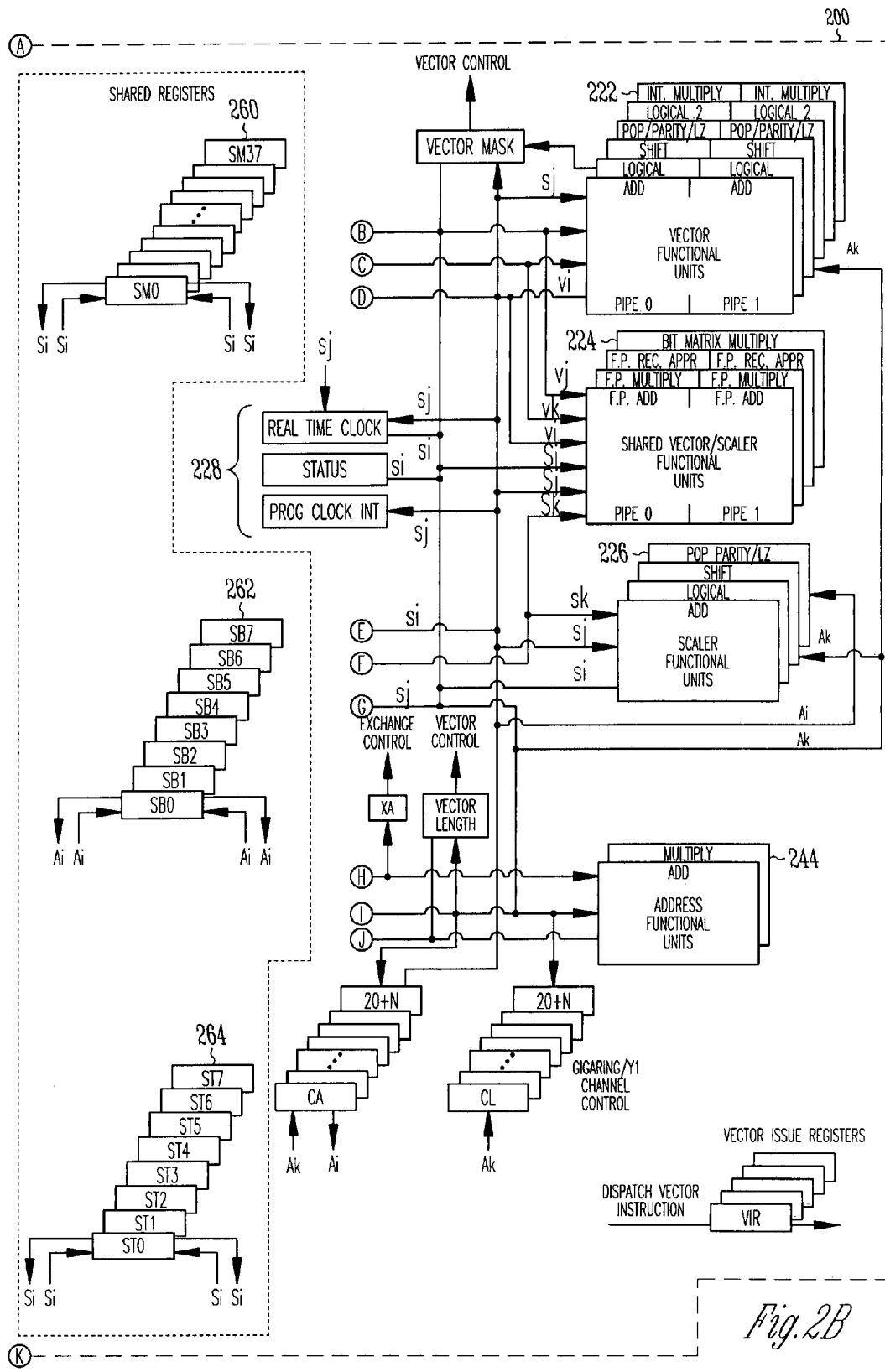

FIG. 2 is a block diagram of one embodiment of a CPU 200 (i.e., an SV1 CPU available from Cray Inc.) coupled to main memory 110. In some embodiments, the instruction set and function of the present invention are added to the architecture of such a CPU 200. In some embodiments, each of the PEs 120 (i.e., PE 121 and PE 122) is implemented as a CPU 200. CPU 200 includes a cache 210 and a processor 211. Processor 211 includes a plurality of vector registers 220, a plurality of vector functional units 222, a plurality of shared vector/scalar functional units 224, a plurality of scalar functional units 226, and a plurality of clock and status units 228. Processor 211 also includes a plurality of scalar registers 230, a plurality of T registers 232, a plurality of address registers 240, a plurality of B registers 242, a plurality of address functional units 244, and a plurality of instruction buffers 250. Processor 211 also includes a plurality of shared registers 260, 262 and 264 that are the source or destination of control and/or data from other processors (e.g., PE 121–PE 122). In some embodiments, two address ports 271 and 272 are provided, each of which can provide memory access commands for read operations and for write operations. In some embodiments, a single instruction could cause all 64 elements (each having 64 bits, and in some embodiments, each also having single-bit-correct/double-bit-detect error correction bits (ECC)) of a vector register (e.g., V0 of vector registers 220) to be successively written to memory 110. In some embodiments, an address port 271 or 272 would provide corresponding memory addresses for each of the plurality of elements. Similarly, a single read instruction can cause sixty-four elements to be read from memory 110 and placed in one of the vector registers 220.

Further details regarding various embodiments of processor 200 can be found in U.S. Pat. Nos. 4,128,880, 5,349,677, 5,434,970, 5,526,487 and 5,623,685 each of which is incorporated by reference.

In some embodiments, the present invention includes a conventional "test-and-set" (TAS) instruction that performs an atomic resource-synchronization function (i.e., reading a memory location, testing one or more bits of the data read, and setting each of the one or more bits tested and storing the result back into the memory location). The test of the bit(s) tells the processor performing this TAS instruction whether any other processor (or other process on this processor) has previously performed a TAS to set the bits being tested. If so, this processor will know that someone else is using the resource signified by the bit(s) tested (each such bit is also called a flag or lock), and will wait for the resource to be freed up and the bits then to be reset. The software will typically wait for a period of time and then retry the TAS instruction. In some embodiments, the TAS tests one or more bits of the shared registers 260 that can be accessed and/or controlled by the other processors. In other embodiments, the TAS tests one or more bits of the shared registers 261 or 262 that can be accessed and/or controlled by the other processors. In other embodiments, the TAS is an operation performed on a data location in memory 110. In any case, the operation as observed by the other processors is atomic, in that once the location is tested by a TAS executed by a first processor, it will be set before any other processor can test it with their own TAS.

According to the present invention, it is desirable to retain the TAS functionality for some legacy programs, while enhancing the functionality for other programs. In particular, it is desirable to be able to invalidate some or all of the data in cache 210 by the mere execution of the TAS instruction for some programs, however for other programs, the TAS should execute without affecting the cache 210.

Thus, the present invention adds two instructions, an enable-test-and-set-invalidate (ETSI) instruction that enables the cache-invalidate function of TAS, and an disable-test-and-set-invalidate (DTSI) instruction that disables the cache-invalidate function of TAS.

Figure 3:
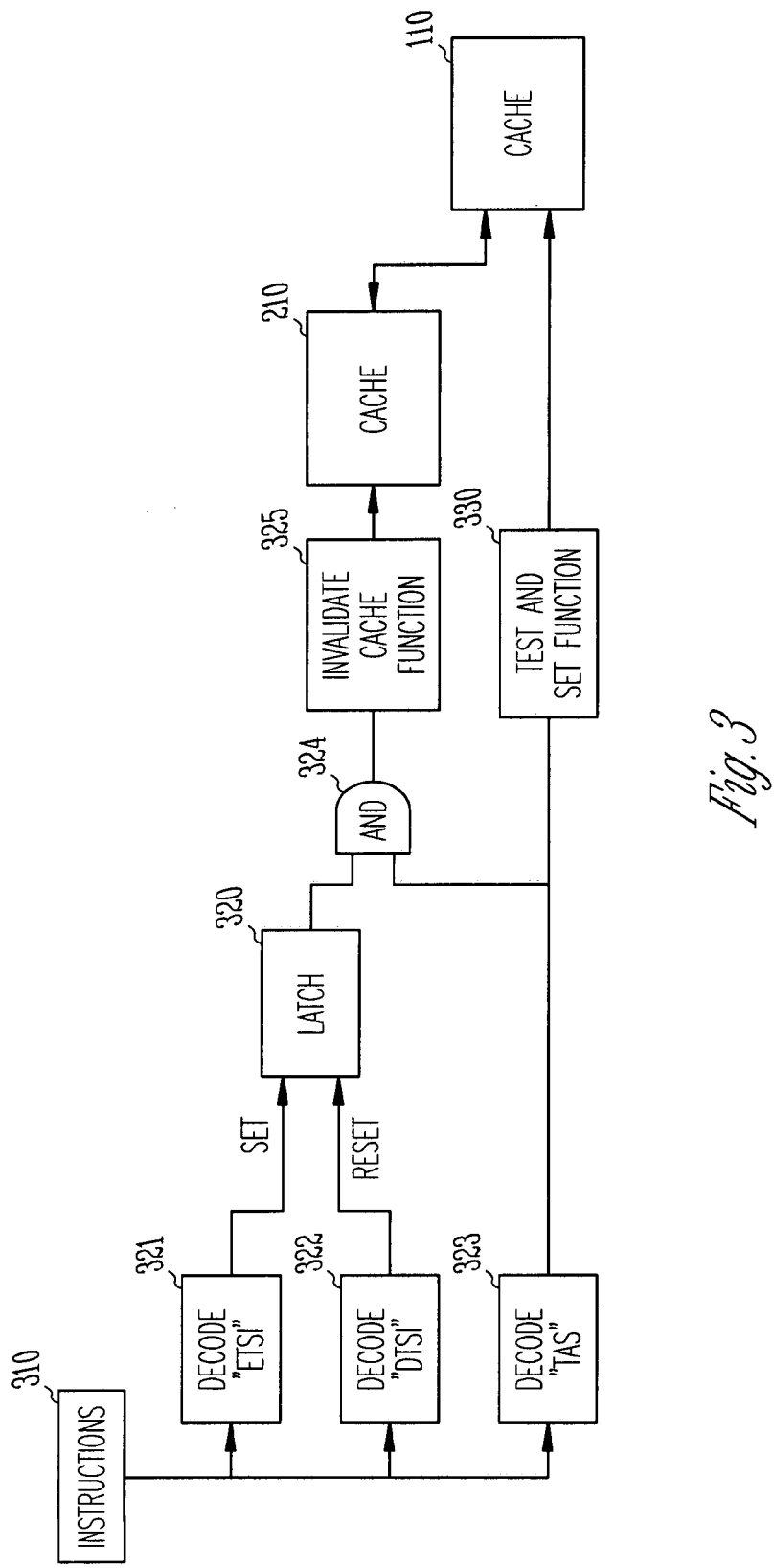
FIG. 3 is a block diagram of a circuit 300 providing enable and disable of a cache invalidate function for a TAS instruction.

FIG. 3 shows a block diagram of one embodiment of a circuit 300 that implements the present invention. Instructions 310 from the instruction buffers 250 (see FIG. 2) are decoded. Block 321 decodes the ETSI instruction, and if the ETSI instruction is executed, sends a signal to latch 320 to set that latch (i.e., to a one), while Block 322 decodes the DTSI instruction, and if the DTSI instruction is executed, sends a signal to latch 320 to reset that latch (i.e., to a zero). Latch 320 thus tells whether the invalidate-cache function is enabled for the TAS instruction. If so, when block 323 decodes a TAS instruction, AND gate 324 will signal block 325, which invalidates one or more lines of cache 210. The decoded TAS also activates and executes the test-and-set function 330, which, in some embodiments, operates on memory 110. In some embodiments, all of cache 210 is invalidated. When the date in cache 210 is marked as invalid, processor 211 is forced to re-fetch any data it needs from memory 110, and in this way other data is prefetched and cache 210 is refilled with new data.

For programs (or sections of programs) that do not wish to have cache 210 invalidated each time a TAS instruction is executed, the DTSI instruction is executed, so that latch 320 contains a zero, thus AND gate 324 will disable the cache invalidate function 325. The decoded TAS only activates and executes the test-and-set function 330, which, in some embodiments, operates on memory 110.

Another aspect of the present invention provides a computer instruction set that includes a "clear port of reads" (CPR) instruction, a "clear port of writes" (CPW) instruction, and a "clear port of all reads and writes" (CPA) instruction. In some embodiments, each CPU 200 includes two address ports, each capable of issuing both read operations and write operations. It is desirable for certain synchronization operations to ensure that all access operations for all vector and other instructions have left a port before starting another operation that depends on such conditions. It is not required that all of the operations complete, just that all of the addresses have been sent by the port. For example, in some embodiments of processor 200 of FIG. 2, a vector instruction that required 64 elements to be read from memory causes an address port (e.g., one or the other of 271 or 272) to sequentially issue the 64 addresses that the data is to be fetched from. The data may be found in cache 210, or if not there, the addresses will be sent to memory 110. Further, such a read instruction may be held up or stalled until previous data in the vector register can be moved elsewhere. Thus, a plurality of instructions may be pending, and the software would need to know, at some point in the code, that all of those instructions, including the vector read instruction, had cleared the address ports 271 and 272. A software program wishing to ensure that all the addresses (from all prior instructions and including all addresses of the vector read instruction) have issued would insert a CPR (or a CPA) into the instruction stream after the vector read, and no further instructions after the CPR (or CPA) would be allowed to issue or execute until all the addresses had left the respective address port. Similarly, a vector instruction that required 64 elements to be written to memory causes an address port (e.g., one or the other of 271 or 272) to sequentially issue the 64 addresses that the data is to be stored to. The data may be found in cache 210, and overwritten there, or if not found there, the addresses will be sent to memory 110. A software program wishing to ensure that all the addresses have issued would insert a CPW (or a CPA) into the instruction stream after the vector write instruction, and no further instructions after the CPW (or CPA) would be allowed to issue or execute until all the addresses had left the respective address port. In some embodiments, the CPR/CPW/CPA instructions each test both address ports. In other embodiments, each instruction includes a field specifying which address port to test.

In other embodiments (not shown), one or more dedicated address ports is provided for read operations, and only read operations go out those address read ports; and one or more dedicated address ports is provided for write operations, and only write operations go out those ports. In such embodiments, the CPR only needs to test the address read ports, and the CPW only needs test the address write ports, and the CPA tests all ports.

In some embodiments, the following instruction opcode encodings are used:
CPA=002704
CPR=002705
CPW=002706
ETSI=002703
DTSI=002707

CONCLUSION

One aspect of the present invention provides a method of maintaining a cache memory in a computer system having a first processor 121, a first memory 111, and at least a first cache 210 between the first processor 121 and the first memory 111. This method includes performing a first memory access to the first memory 111 by the first processor 121, storing a first cache line from the first memory 111 into the first cache 210, performing an instruction that enables a cache-invalidate function to be performed by the first processor 121 upon execution of a resource-synchronization instruction, performing the resource-synchronization instruction, wherein at least the first cache line is invalidated in the first cache 210 (in some embodiments, the entire cache 210 is invalidated), performing a second memory access to the first memory 111 by the first processor 121, storing a second cache line from the first memory 111 into the first cache 210, performing an instruction that disables the cache-invalidate function from being performed by the first processor upon execution of the resource-synchronization instruction, and performing the resource-synchronization instruction, wherein at least the second cache line is not invalidated in the first cache.

In some embodiments of the method, the computer system 100 further includes a second processor 122 and at least a second cache 210 (one associated with processor 122) between the second processor 122 and the first memory 111. The method further includes performing a third memory access to the first memory by the second processor, storing a third cache line from the first memory into the second cache, performing the instruction that enables the cache-invalidate function to be performed by the second processor upon execution of the resource-synchronization instruction, performing the resource-synchronization instruction, wherein at least the third cache line is invalidated in the second cache, and wherein no data in the first cache is invalidated, performing a fourth memory access to the first memory by the second processor, storing a fourth cache line from the first memory into the second cache, performing the instruction that disables the cache-invalidate function from being performed by the second processor upon execution of the resource-synchronization instruction, performing the resource-synchronization instruction, wherein at least the fourth cache line is not invalidated in the first cache.

In some embodiments of the method, the resource-synchronization instruction is a test-and-set instruction.

In some embodiments of the method, the instruction that enables the cache-in-validate function is an enable-test-and-set-invalidate instruction, and the instruction that disables the cache-invalidate function is an disable-test-and-set-invalidate instruction.

In some embodiments of the method, by the performing the resource-synchronization instruction, the entire first cache is invalidated.

Another aspect of the present invention provides a computer instruction set that includes a resource-synchronization instruction, an instruction that enables a cache-invalidate function to be performed upon execution of the resource-synchronization instruction, and an instruction that disables the cache-invalidate function from being performed upon execution of the resource-synchronization instruction.

In some embodiments, the resource-synchronization instruction is a test-and-set instruction. In some such embodiments, the instruction that enables the cache-in-validate function is an enable-test-and-set-invalidate instruction, and the instruction that disables the cache-invalidate function is an disable-test-and-set-invalidate instruction.

In some embodiments (regardless of whether a TAS instruction is used), the instruction that enables the cache-invalidate function is an enable-resource-synchronization-instruction-invalidate instruction, and the instruction that disables the cache-invalidate function is an disable-resource-synchronization-instruction-invalidate instruction.

Another aspect of the present invention provides an information-processing system 100 that includes a first processor 121, a first memory 111, at least a first cache 210 between the first processor 121 and the first memory 111, wherein the first cache 210 caches data accessed by the first processor 121 from the first memory 111, wherein the first processor 121 executes: a resource-synchronization instruction, an instruction that enables a cache-invalidate function to be performed upon execution of the resource-synchronization instruction, and an instruction that disables the cache-invalidate function from being performed upon execution of the resource-synchronization instruction.

In some embodiments of the system 100, the resource-synchronization instruction is a test-and-set instruction.

In some embodiments of the system 100, the instruction that enables the cache-invalidate function is an enable-test-and-set-invalidate instruction, and the instruction that disables the cache-invalidate function is an disable-test-and-set-invalidate instruction.

In some embodiments of the system 100, the cache-invalidate function invalidates the entire first cache.

Some embodiments of the system 100 further include a second processor 122, and at least a second cache 210 between the second processor and the first memory 111, wherein the second cache 210 caches data accessed by the second processor 122 from the first memory 111, wherein the second processor executes: the resource-synchronization instruction, the instruction that enables a cache-invalidate function to be performed upon execution of the resource-synchronization instruction, and the instruction that disables the cache-invalidate function from being performed upon execution of the resource-synchronization instruction It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A method of maintaining a cache memory in a computer system having a first processor, a first memory, and at least a first cache between the first processor and the first memory, the method comprising:

performing a first memory access to the first memory by the first processor;

storing a first cache line from the first memory into the first cache;

performing an instruction that enables a cache-invalidate function to be performed by the first processor upon execution of a resource-synchronization instruction;

performing, within the first processor, a resource-synchronization instruction that operates on a first memory location in the first memory, wherein performing the resource synchronization instruction includes modifying the first memory location in the first memory and invalidating at least the first cache line in the first cache during execution of the resource synchronization instruction on the first memory location in the first memory;

performing a second memory access to the first memory by the first processor;

storing a second cache line from the first memory into the first cache;

performing an instruction that disables the cache-invalidate function from being performed by the first processor upon execution of the resource-synchronization instruction;

performing the resource-synchronization instruction on a second memory location in the first memory, wherein performing the resource synchronization instruction includes modifying the second memory location in the first memory without invalidating the second cache line in the first cache.

2. The method of claim 1, wherein the computer system further includes a second processor and at least a second cache between the second processor and the first memory, the method further comprising:

performing a third memory access to the first memory by the second processor;

storing a third cache line from the first memory into the second cache;

performing the instruction that enables the cache-invalidate function to be performed by the second processor upon execution of the resource-synchronization instruction;

performing, within the second processor, a resource-synchronization instruction that operates on a third memory location in the first memory, wherein performing the resource synchronization instruction includes modifying the third memory location in the first memory and invalidating at least the third cache line in the second cache during execution of the resource synchronization instruction on the third memory location in the first memory, and wherein no data in the first cache is invalidated;

performing a fourth memory access to the first memory by the second processor;

storing a fourth cache line from the first memory into the second cache;

performing the instruction that disables the cache-invalidate function from being performed by the second processor upon execution of the resource-synchronization instruction;

performing, within the second processor, a resource-synchronization instruction that operates on a fourth memory location in the first memory, wherein performing the resource synchronization instruction includes modifying the fourth memory location in the first memory, wherein at least the fourth cache line is not invalidated in the second cache.

3. The method of claim 2, wherein the resource-synchronization instruction is a test-and-set instruction.

4. The method of claim 3, wherein the instruction that enables the cache-invalidate function is an enable-test-and-set-invalidate instruction, and the instruction that disables the cache-invalidate function is an disable-test-and-set-invalidate instruction.

5. The method of claim 1, wherein the resource-synchronization instruction is a test-and-set instruction.

6. The method of claim 5, wherein the instruction that enables the cache-invalidate function is an enable-test-and-set-invalidate instruction, and the instruction that disables the cache-invalidate function is an disable-test-and-set-invalidate instruction.

7. The method of claim 1, wherein invalidating at least the first cache line in the first cache during execution of the resource synchronization instruction on the first memory location in the first memory includes invalidating the entire first cache.

* * * * *